Dec. 10, 1963     E. E. LEWIS     3,113,341
AUTOMATIC POULTRY SHACKLES
Original Filed July 13, 1959     3 Sheets-Sheet 1
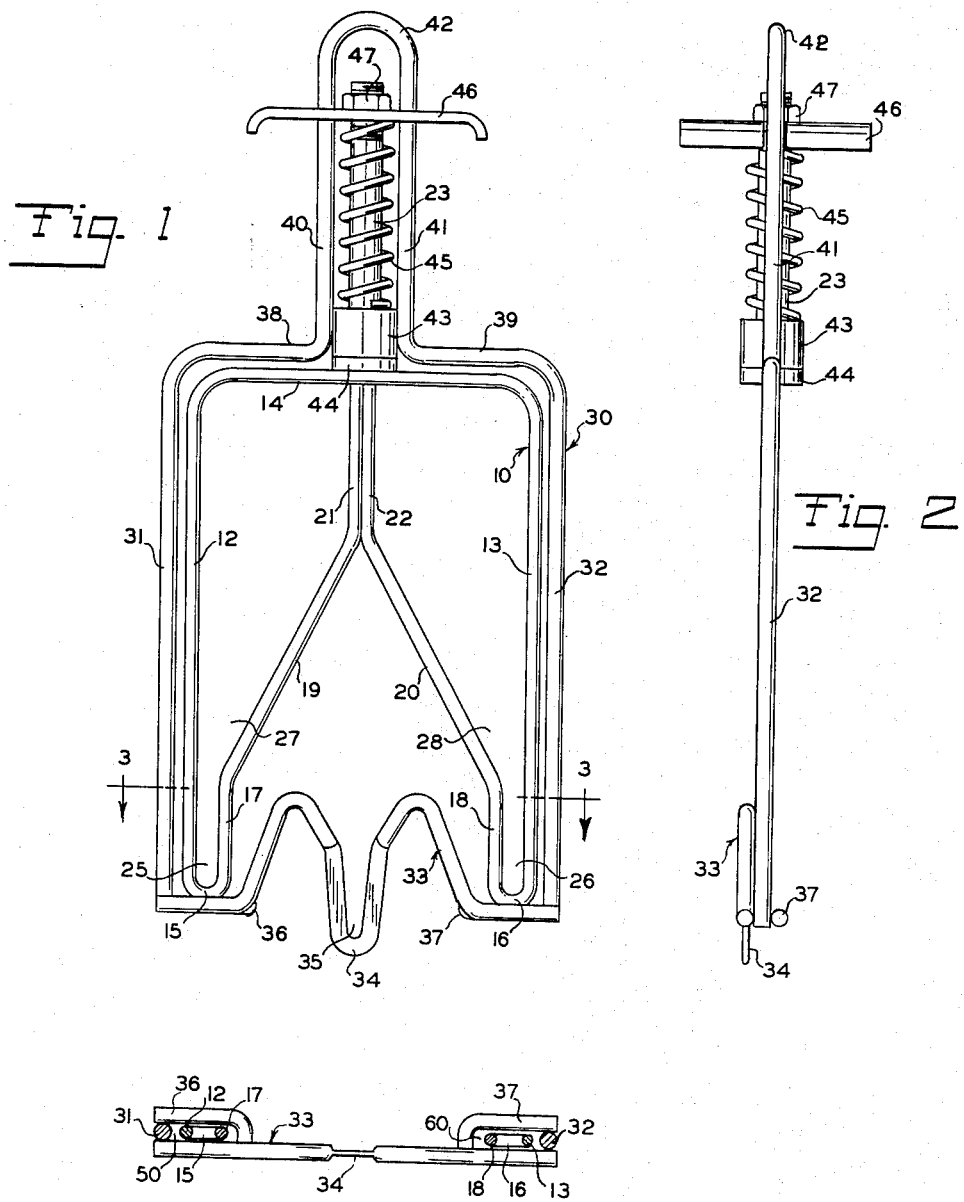
INVENTOR.
ERNEST E. LEWIS
BY
ATTORNEY

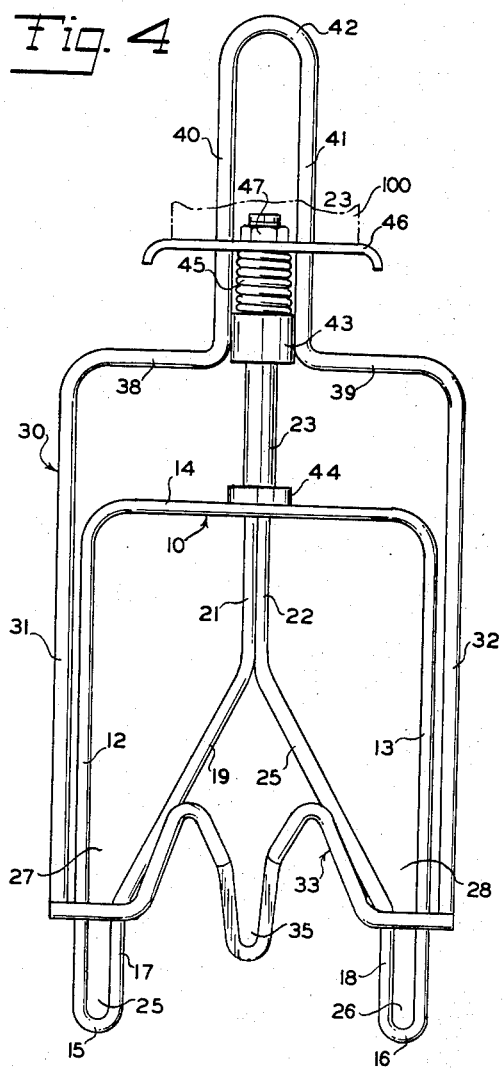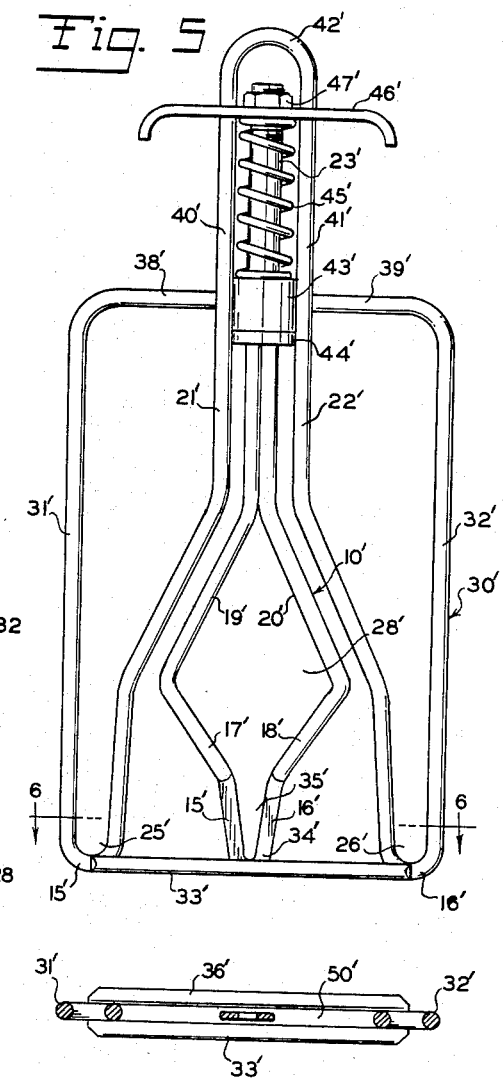
INVENTOR:
ERNEST E. LEWIS

Dec. 10, 1963     E. E. LEWIS     3,113,341
AUTOMATIC POULTRY SHACKLES
Original Filed July 13, 1959     3 Sheets-Sheet 3

INVENTOR:
ERNEST E. LEWIS
BY:
ATTORNEY

United States Patent Office 3,113,341
Patented Dec. 10, 1963

3,113,341
AUTOMATIC POULTRY SHACKLES
Ernest E. Lewis, Gainesville, Ga., assignor to Gainesville Machine Company, Gainesville, Ga., a corporation of Georgia
Continuation of application Ser. No. 826,835, July 13, 1959. This application May 10, 1962, Ser. No. 195,656
13 Claims. (Cl. 17—44.1)

The present invention relates to automatic poultry shackles and is more particularly concerned with a shackle or suspension device of the type employed to support fowls when they are being killed, scalded, picked or otherwise treated during processing operations, and to a method for removably supporting and releasing the fowls.

This is a continuation of my copending application, Serial No. 826,835, filed July 13, 1959 for "Automatic Poultry Shackles," now abandoned.

In the past many shackles for use in the processing of poultry have been developed. Most of these prior art devices support the poultry by the legs or by the head. Usually such devices are complicated and, especially where it is desired automatically to release the poultry at a predetermined station in its travel, devices for accomplishing this purpose have included various clamping arrangements utilizing hinged parts. Since these parts are subjected to heat and moisture almost constantly, the parts become corroded or rusted, and thus become either inoperative or unsatisfactory in operation.

Other less complicated devices have been developed to overcome the disadvantage of having hinged and spring loaded parts but these devices usually require manual unloading. Such a shackle is shown in U.S. Patent No. 2,613,390. The shackle disclosed in the above mentioned patent operates very nicely, but nevertheless, each fowl inserted on the shackle must be removed from the hot shackle by hand. In so doing, the operator normally lifts the fowl by its legs, if the head is engaged by the shackle, or by its neck if the legs are engaged by the shackle. This is a time consuming operation which is costly.

On the other hand, the automatically releasable shackles are usually difficult to handle when inserting the live fowl thereon because both legs must be simultaneously inserted in the shackle and held in place as the shackle is closed.

Accordingly, it is an object of the present invention to provide an automatic shackle having few moving parts and having no hinged parts.

Another object of the present invention is to provide an automatic shackle having a retaining frame of rigid and non-resilient construction having no movable parts or parts capable of flexure or distortion.

Another object of my invention is to provide an automatic shackle in which the leg portions of the fowl do not need to be inserted simultaneously.

Another object of my invention is to provide an automatic shackle which may be selectively operated as an automatically releasable shackle or a manually operated shackle without adjustment of parts.

Another object of my invention is to provide a shackle in which a fowl is easily and effectively inserted and retained.

Another object of my invention is to provide an automatic shackle which will effectively release the fowl at a predetermined location.

Another object of my invention is to provide an automatic shackle which is inexpensive to manufacture, durable in construction and efficient in operation.

Another object of my invention is to provide a method by which a fowl is effectively supported as it is processed and automatically released at a predetermined position.

Other and further objects, features and advantages of the present invention will become apparent from the following description when taken in conjunction with the accompanying drawings wherein like characters of reference designate corresponding parts throughout the several views, and wherein:

FIG. 1 is a front elevation or face view of one form of the automatic poultry shackle constructed in accordance with the present invention, the elements thereof being in a position to receive a fowl by its legs.

FIG. 2 is a side elevation of the automatic poultry shackle shown in FIG. 1.

FIG. 3 is a cross sectional view taken along line 3—3 in FIG. 1.

FIG. 4 is a front elevation similar to FIG. 1 showing the elements of the poultry shackle in the poultry releasing position.

FIG. 5 is a front elevation of a modified form of my automatic shackle specifically adapted to receive a fowl by its neck.

FIG. 6 is a cross sectional view taken along lines 6—6 in FIG. 5.

Figures 7, 8:
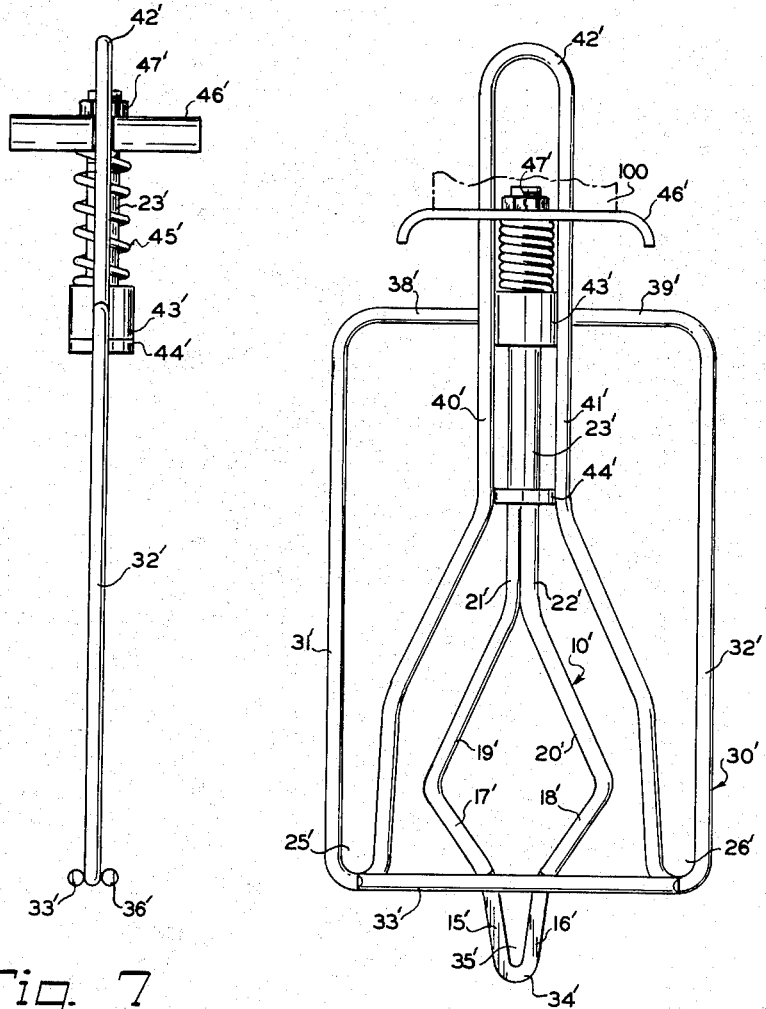
FIG. 7 is a side elevation of the automatic poultry shackle shown in FIG. 5.
FIG. 8 is a front elevation similar to FIG. 5 showing the elements of the modified poultry shackle in the poultry releasing position.

Referring now in detail to the embodiments chosen for the purpose of illustrating the present invention, in FIGS. 1, 2, 3 and 4, it will be seen that one form of the present invention includes an inner poultry supporting or retaining frame 10 which is movable up and down and an outer poultry releasing or ejector frame 30 which remains at a predetermined height so that, upon relative motion between the two frames, the outer frame 30 will cause the fowl to be released from the inner frame 10. The two frames 10 and 30 are preferably made from a non-corrosive metal rod or metal rod treated to render it corrosive-resistant.

The inner frame 10 is composed of a metallic rod shaped into rectangular form and includes a pair of spaced, downwardly extending, parallel side bars, indicated respectively by numerals 12 and 13 and an integral top bar 14 joining the upper ends of side bars 12 and 13. At their lower ends the side bars 12 and 13 are bent inwardly and then upwardly rather sharply to form fowl receiving loop parts or loops as indicated at 15 and 16 and then extend upwardly to form the inner longitudinal bars 17 and 18. The inner bars 17 and 18 continue upwardly, converging toward each other as at numerals 19 and 20 to join at the central upper portion of the inner frame 10. Thence, the inner bars 17 and 18 run parallel and adjacent to each other, as at numerals 21 and 22 and are attached, as by welding, to the top bar 14. Attached to the top of bar 14, in line with bars 21 and 22, is a central upwardly extending stem or actuator bar 23 centrally of the frame 10. The actuator bar 23 terminates well above top bar 14 to constitute a suspension member by which the entire inner frame 10 is supported.

It will be noted that the frame 10 including the inner bars 17 and 18 may be formed of a single continuous section of metal rod, having the junction spot welded or otherwise secured. This formation of the inner frame 10 results in the production of a very strong and rigid frame structure which will not be damaged by rough handling of my shackle.

The lower or base portions of the inner bars 17 and 18 extend substantially parallel to the side bars 12 and 13, and the spacing between the bars 12 and 17 forms a leg receiving recess, space, or notch 25 while a similar spacing 26, between the bar 13 and the inner bar 18 constitutes a second leg notch, space or recess. The loops or bends 15 and 16 at the lower end of the inner frame 10 lie in the same vertical plane with the top bar 14, the side bars 12 and 13 and the inner bars 17 and 18.

It is therefore seen that I have provided a retaining frame 10 having wedge members comprising side bars 12 and 13 and inner bars 17 and 18 at its lower end, and an actuator bar 23 at its upper or opposite end. The space, recess or notch 25 formed between side bar 12 and inner bar 17 is sufficient to receive the leg of a fowl but is insufficient for the feet of the fowl to pass therethrough. The open space 27 above the space 25, however, is sufficient to permit ready passage of the feet of the fowl therethrough. Similarly, space, recess or notch 26 is insufficient for the feet of the fowl to pass therethrough but the space 28 thereabove is sufficient.

Thus it is seen that I have provided a rigid inner retaining frame 10 having an upwardly extended inner frame portion provided with leg portions 17 and 18 cooperating with the outer frame portion in forming spaces 25 and 26 for receiving the legs of the suspended fowl, these spaces being defined at their lower ends by loops 15 and 16. The inner frame portion is thus in the form of an inverted V-shape which has its apex below the top bar 14 of the outer frame portion and a central, upwardly extending actuator bar or suspension member 23 extending above top bar 14.

According to the present invention, the outer ejector frame 30 forms a forked member and includes a pair of parallel vertically extending legs or side members 31 and 32 which extend downwardly adjacent and on the outside of the side bars 12 and 13, respectively. The lower ends of the side members 31 and 32 are joined by a front cross bar or ejector bar or plate 33, the central portion of which may be bent upwardly and then downwardly to form a V-shaped loop 34 to provide a central notch 35 for receiving the neck of the fowl. This ejector bar 33 is fixed to the front sides of the side members 31 and 32 and serves as a means for discharging the legs of the fowl from the spaces 25 and 26 when the inner retaining frame 10 is moved downwardly with respect to the outer ejector frame 30. The central V-shaped loop 34 may be flattened to more easily accommodate the neck of the fowl, if desired.

Welded to the rear sides of the end of side members 31 and 32 are a pair of back cross bars or ejector bars or plates 36 and 37 which protrude inwardly parallel to the end portions of bar 33 and are bent forwardly to be secured to intermediate portions of ejector bar 33. Thus is provided a passage formed by slots on passage means 50 and 60, defined by side member 31 and ejector bars 33 and 36 and by side member 32 and ejector bars 33 and 37, respectively. The leg retaining means or wedge members defined by side bars 12 and inner bar 17 and by side bar 13 and inner bar 18 are adapted to be reciprocated through these slots. The purpose of the back ejector bars 36 and 37 is to cooperate with the front ejector bar 33 in discharging the fowl from the leg retaining means. The loops 15 and 16 do not protrude above the ejector bars 33, 36 and 37 and hence are restrained against lateral movement.

It will be understood that the outer side members 31 and 32 are preferably formed from slightly larger diameter wire than the inner frame 10 and that the lower portions of the inner frame 10 are slidable within and between the ejector bars 33, 36 and 37.

It is therefore seen that there is provided a slightly greater space between the inner surfaces of ejector bars 33, 36 and 37 than the thickness of the inner frame 10.

Referring now to the upper portion of outer ejector frame 30, it will be seen that the upper ends of side members 31 and 32 are turned inwardly to provide a pair of aligned top members or shoulders 38 and 39 which extend toward each other and toward actuator bar 23, above and parallel to the top bar 14. The inner ends of top members 38 and 39 bent upwardly to provide an elongated inverted U-shaped shank having a pair of longitudinal suspension bars 40 and 41 which extend parallel to each other and parallel to and on opposite sides of actuator bar 23. The upper ends of suspension bars 40 and 41 terminate in a suspension loop 42 extending around the upper end of actuator bar 23.

Between the inner ends of top members 38 and 39 and supported by the lower end portions of suspension bars 40 and 41 is a bearing disk, seat or collar 43 having a central aperture and which journals, for slidable movement, the actuator bar 23. A complementary collar 44 is provided on the lower end of rod 23 to limit the upward movement of actuator bar 23. Coiled around the actuator bar 23 above collar 43 is a helical spring 45, the lower end of which abuts against the top of collar 43.

A camming member 46 or plate is provided at the upper end of actuator bar 23 and is retained in place by an internally thread nut 47, threadedly engaging external threads on the upper end of actuator bar 23. The upper end of spring 45 acts against camming member 46 so as to urge the inner frame to a poultry receiving position as shown in FIG. 1. In other words, spring 45 is normally operative on the inner frame 10 to maintain the inner frame 10 nested within the outer frame 30 and with its notches 25 and 26 free of the cross bars 33, 36 and 37. Of course, when the outer frame 30 is restrained against downward movement and the camming member 46 depressed, the inner frame 10 is urged downward against spring tension to a poultry releasing position as shown in FIG. 4.

The camming member 46 is preferably a flat plate having wings protruding in a horizontal plane outwardly of the longitudinal suspension bars 40 and 41, the opposite ends of which have bent portions. Appropriate apertures are provided in the camming member 46 so that it may slide along bars 40 and 41.

Of course, it is apparent to those skilled in the art that the fowl may be supported by a shackle or any appropriate narrow portion of the body. Thus a shackle which supports the neck between wedge members would be suitable. Accordingly, a modified form of my invention is shown in FIGS. 5, 6, 7 and 8 containing all of the essential elements of the present invention. In this modification, the central wedge members are provided to receive the neck rather than the legs as previously described. In the modified form of the present invention, the outer ejector frame 30' is provided with side members 31' and 32', top members 38' and 39' identical with the similar members of the previous embodiment. The ejector bars 33' and 36' extend parallel to each other across the lower ends of side members 31' and 32' to provide a central slot passage or passage means 50', defined by the inner surfaces of bars 33' and 36' and the inner surfaces of side members 31' and 32'.

The longitudinal suspension bars 40' and 41' are joined at their upper ends by a suspension loop 42', and project downwardly within the outer frame to join integrally the ends of side members 31' and 32', thereby providing loops 15' and 16' having spaces 25' and 26' for receiving the legs of a fowl. A collar 43' is provided between the inner ends of top members 38' and 39', the collar 43' being supported by bars 40' and 41'. The actuator bar 23' rides within the collar 43' and the spring 45' urges the camming member 46' upwardly, the camming member 46' being retained at the upper end of actuator bar 23' being limited by the abutment against collar 43' of collar 44' fixed on the lower end of actuator bar 23'.

The inner frame 10' includes the parallel portions 21' and 22' of the inner bars 17' and 18' which diverge downwardly at numerals 19' and 20' and then converge above ejector bars 33' and 36'. The lower end of the inner frame 10' forms a V-shaped neck receiving loop 34' comprising upwardly diverging wedge member 15' and 16' which integrally joins the ends of the converging portions of inner bars 17' and 18'. The neck receiving loop 34' thus defines a notch or space 35′ for the receipt of the neck of a fowl and projects into the slot 50′.

From the foregoing description, the operations of the present devices are apparent. In the embodiment shown in FIGS. 1, 2, 3 and 4, the device is suspended by a chain (not shown) of the usual conveyor system in a poultry process plant. The feet of a fowl are then inserted through the spaces 27 and 28 as the shackle is suspended in its poultry receiving position, as shown in FIG. 1. Immediately after the feet are inserted through spaces 27 and 28, the fowl is moved downwardly so that the lower leg portions of the fowl are wedged or suspended within the spaces 25 and 26. All of this, of course, is accomplished in a very short period of time. The fowl is then carried with its body suspended from the shackle by its feet and legs through the usual process wherein the fowl is killed, dipped in scalding water, and the feathers beat from the body by opposed rotating drums having picker fingers. The fowl is then enviscerated and is carried to an unloading zone where there are arranged a pair of cam actuating members 100, between which the chain of the conveyor travels. These cam actuating members 100 have downwardly inclined lower surfaces which, as the shackle is moved by the conveyor, engage the upper surface of the camming member 46 and gradually urge it downwardly to the poultry releasing position shown in FIG. 4. As the camming member 46 is urged downwardly, it carries with it the actuator bar 23 which moves the entire inner frame downwardly. Therefore, the wedge members, comprising the lower portions of side bars 12 and 13 and the lower portion of inner bars 17 and 18, project through the passages or slots 50 and 60. As the wedge members move through the slots 50 and 60, the ejector bars 33, 36 and 37 engage the legs of the fowl substantially simultaneously and hold these legs against downwardly movement as the inner frame 10 continues its downward movement. Thus, eventually, as the inner frame approaches its position as shown in FIG. 4, the legs of the fowl are moved relative to the inner frame 10 to the spaces 27 and 38 where the pull of gravity on the body of the fowl urges the legs out of engagement with the wedge members and the feet of the fowl pass through spaces 27 and 28, thereby automatically disengaging the fowl from the shackle. Thence, the fowl falls by gravity into a suitable receptacle (not shown) at a predetermined position in the travel of the shackle along the conveyor.

The modified form of the present invention operates in essentially the same manner, except that it is loaded by inserting the head of the fowl through the space 28′ and released, so that the neck is urged into space 35′. On reaching the actuating members 100, the inner frame 10′ is urged downwardly with respect to the outer frame 30′ to a position shown in FIG. 8, thereby causing relative movement between the neck of the fowl and the inner frame 10′ so as to position the neck in or adjacent the space 28′. Thus, the weight of the fowl causes the head to be withdrawn through space 28′, the fowl falling by gravity to a position therebelow.

It will be obvious to those skilled in the art that many variations may be made in the embodiments chosen for the purpose of illustrating the present invention without departing from the scope of my invention as defined by the appended claims.

I claim:

1. A poultry shackle comprising an inner frame, an outer frame, said inner frame comprising a pair of leg receiving loops spaced from each other, said outer frame including ejector bars on opposite sides of said loops at one end thereof and means connected to said ejector bars for suspending said shackle at the other end thereof, said inner frame including an actuator bar connected to said inner frame and extending toward said means for suspending said shackle, said actuator bar being reciprocative with respect to said means for suspending said shackle to reciprocate said loops with respect to said ejector bars, and means connected to said actuator bar for reciprocating said actuator bar.

2. A poultry shackle comprising a section of metallic rod defining an inner frame having side bars, said side bars having a bend at one end to form leg receiving loops, an actuator bar extending upwardly from the other end of said inner frame, a section of metallic rod defining a three sided outer frame having longitudinal portions joined by a central suspension loop extending upwardly and around said actuator bar, a camming plate connected to said actuator bar and slidable along said longitudinal portions, spring means acting between said outer frame and said camming plate for urging said inner frame within said outer frame, said outer frame having side members extending outwardly adjacent said side bars, and ejector means extending from the ends of said side members adjacent said leg receiving loops.

3. The structure defined in claim 2 wherein said ejector means includes ejector bars extending between the ends of said side members and providing spaced slots through which said leg receiving loops pass upon actuation of said actuator bar.

4. The structure defined in claim 3 wherein said inner frame includes a top bar, said side bars after forming said leg receiving loops extending parallel to each other and then converging upwardly and joining the central portion of said top bar.

5. A shackle comprising, an outer frame, a fowl-engaging inner frame mounted within and slidably movable relatively to the outer frame, the outer frame having an elongated loop member at the top and provided with an ejector bar at the bottom, the inner frame having a central, upwardly-extending stem located within the loop, a plate secured to the stem and slidably mounted on the loop, a spring located between the plate and a part of the outer frame and acting to normally maintain the inner and outer frames in nested relation, the inner frame being provided with fowl-engaging loops, the ejector bar having passages through which said loops are passed by pressure imposed on the plate to compress the spring.

6. A shackle comprising, an outer frame having a cross bar at one end and a suspension loop at the other end, an inner frame fitted within the outer frame and slidable relatively thereto, the inner frame having fowl-receiving loop parts, said loop parts being movable to cross the cross bar on sliding movement of the inner frame, and in a manner to cause any fowl parts held by said fowl-receiving parts to be disengaged therefrom by contact with the cross bar, and means operative on a part of the inner frame for normally maintaining the fowl-receiving parts of said inner frame away from the cross bar.

7. A shackle comprising, a fork in the form of an outer frame, a fowl-engaging inner frame mounted within and slidably movable relatively to the outer frame, the outer frame having an elongated loop member at the top and provided with a cross member at the bottom, the inner frame having a central, upwardly-extending stem located within the loop, a plate secured to the stem and slidably mounted on the loop, a spring located between the plate and a part of the outer frame and acting to normally maintain the inner and outer frames in nested relation, the inner frame being provided with fowl-engaging recesses, the cross member having passages through which said recesses are passed by pressure imposed on the plate to compress the spring.

8. A shackle comprising an outer frame in the form of a forked member including a pair of spaced legs, shoulders at one end of the legs, an inverted U-shaped shank extending from the shoulders, said shank including a suspension loop at one end, an inner frame slidably mounted within the outer frame and provided at one end with notches for receiving parts of a fowl, the frame having a stem at its other end, said stem slidably fitting within the shank, a cross member connecting the legs of the outer frame, said cross member having a passage through which the notches are slidable, a seat carried by the shoulders of the outer frame, a coil spring having one end resting against said seat, a plate mounted on the end of the stem, and the second end of the coil spring resting against said plate.

9. A shackle as provided for in claim 8, wherein the seat is in the form of a disk provided with a central aperture through which the stem is slidable; and the plate is provided with downwardly-bent portions at its opposite ends.

10. A shackle comprising, an outer frame having a cross bar at one end and a suspension loop at the other end, an inner frame fitted within the outer frame and slidable relatively thereto, the inner frame having fowl-receiving parts, said parts being movable across the cross bar on sliding movement of the inner frame, and in a manner to cause any fowl parts held by the fowl-receiving parts to be disengaged therefrom by contact with the cross bar, and means for normally maintaining the fowl-receiving parts so positioned relatively to the cross bar that elements of the fowl can be inserted in said fowl-receiving parts.

11. A shackle having an outer frame provided with spaced legs and a looped shank, an inner frame slidably movable relatively to the outer frame, the inner frame being provided with notches to recevie parts of a fowl, a cross member extending between the legs of the outer frame, said cross member including spaced elements providing passage means between them and through which the parts of the inner frame having the notches are slidably movable in a manner to cause the parts of the fowl to be forced out of the notches by contact with the cross member, and spring means normally operative on the inner frame to maintain the inner frame nested within the outer frame and with its notches positioned free of the cross member.

12. In a shackle, an inner frame composed of metallic rod and shaped into rectangular form and having leg-receiving notches, an outer frame larger than the inner frame and fitting around the outside of the inner frame, the outer frame including a cross member composed of spaced elements defining passage means between them through which the parts of the inner frame provided with the notches are slidably movable to thereby cause the legs of a fowl then positioned in the notches to be struck by parts of the cross member and thereby forced out of the notches, a spring operative on the inner frame to maintain it within the outer frame with its notches maintained out of the passage means in the cross member, and means carried by the inner frame for causing the spring to be compressed and the inner frame caused to have its notches moved through the passage means upon the imposition of pressure on such means.

13. A shackle comprising an inner frame, said frame being composed of metallic rod, said frame being shaped at one end to provide a plurality of notches to receive parts of a fowl, an outer frame within which the inner frame is slidable, said outer frame including spaced legs connected by a cross member, said cross member consisting of elements spaced apart to provide passage means between them and through which the parts of the inner frame provide with the notches are moved to cause ejection by contact with parts of the cross bar with parts of the fowl engaged by the notches, the inner frame having a central stem located remotely from its notches, the outer frame being provided with a loop within which the stem is slidable, an abutment carried by the end of the stem, the outer frame being provided with a seat, and a coil spring extending around the stem and having one end maintained against the abutment and the other end rested against the seat of the outer frame.

References Cited in the file of this patent

UNITED STATES PATENTS

| | | |
|---|---|---|
| 833,910 | Barnes | Oct. 23, 1906 |
| 2,625,707 | Liittjohann | Jan. 20, 1953 |
| 2,653,346 | Ograbisz | Sept. 29, 1953 |
| 2,658,236 | Altenpohl | Nov. 10, 1953 |
| 2,739,347 | Sharp et al. | Mar. 27, 1956 |
| 2,797,436 | Shadley | July 2, 1957 |